2,913,498
Patented Nov. 17, 1959

2,913,498

PROCESS FOR PREPARING AROMATIC PHOSPHORUS COMPOUNDS

Hugh E. Ramsden, Scotch Plains, N.J., assignor to Metal & Thermit Corporation, Rahway, N.J., a corporation of New Jersey No Drawing. Application September 18, 1956
Serial No. 610,663

7 Claims. (Cl. 260—606.5)

The present invention relates to a process for producing organophosphorus compounds. This application is a continuation-in-part of my application Serial No. 549,571, filed November 28, 1955, which in turn was a continuation-in-part of my application Serial No. 520,145, filed July 5, 1955, both now abandoned.

It has now been discovered that organophosphorus compounds can be prepared by a novel, efficient and economical chemical process.

It is an object of the present invention to provide a process for the production of aromatic substituted phosphorus compounds.

Another object of the invention is to provide a novel process for producing organophosphorus compounds containing at least one aromatic carbon atom bonded to phosphorus.

Still another object of the invention is to provide an efficient process for producing triorganophosphorus compounds.

Other objects and advantages of the process will be apparent from the following description and claims.

Generally speaking, the present invention provides a process for producing trivalent and pentavalent phosphorus compounds. The trivalent phosphorus compounds have the general formula $R_mR'_oR''_pPX_{3-(m+o+p)}$, wherein $m$, $o$, and $p$ have a value of 0, 1, 2, or 3; $(m+o+p)$ is equal to 1, 2, 3; and R, R', and R'' are the same or different and are defined as:

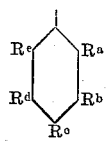

wherein $R^a$, $R^b$, $R^c$, $R^d$ and $R^e$ may be the same or different substituents as long as they do not react with the arylmagnesium chloride reagent employed in the present invention or other components of the reaction mixture and/or products under the process conditions. They may be hydrogen; fluorine, chlorine; and substituted and unsubstituted organic groups, including alkyl, such as methyl, amyl, etc.; alkenyl, such as vinyl, allyl, propenyl, etc.; aryl, such as phenyl, naphthyl, tolyl, xylyl, xenyl, etc.; aralkyl or aralkenyl such as benzyl, phenylethyl, cinnamyl, methylbenzyl, etc.; heterocyclic, such as thienyl, thenyl, furyl, etc.; alkoxy, such as methoxy, ethoxy, allyloxy, etc.; aryloxy, such as phenoxy, tolyloxy, xenyloxy, etc.; and dialkylamino, such as dimethylamino, diethylamino, etc. these groups may include cyclized and fused ring structures; and X is a halogen selected from the class consisting of chlorine, bromine, and iodine. The pentavalent phosphorus compounds are generally similar to the trivalent phosphorus compounds, with certain variances. Pentavalent phosphorus compounds contain at least 1 ionic bond and when made in accordance with the process of the present invention usually have the general formula $R_4PX$ and $R_3PX_2$. If the last X atom is also substituted by an organic group, at least 1 of the organic groups on the pentavalent phosphorus will be ionically bound to the phosphorus.

Phosphonium compounds having the general formula: $[R_aR'_bR''_cR'''_dP]^+Z^-$ wherein $a$, $b$, $c$ and $d$ have a value 0, 1, 2, 3, or 4; the sum $(a+b+c+d)$ being equal to 4; and R, R', R'' having the significance ascribed to them above; R''' is defined as is R, R', or R''; and Z is a negative radical such as $^-OH$, $Cl^-$, $Br^-$, $I^-$, $RCOO^-$, etc., may be produced from the trivalent phosphorus compounds. Compounds somewhat similar to the phosphonium compounds, having the formula $$[R_aR'_bR''_cR'''_dP]^-Y^+$$

wherein Y is a positive radical such as $Na^+$, $Li^+$, etc., may also be prepared from the trivalent phosphorus compounds.

The present process for producing aromatic phosphorus compounds comprises reacting substituted or unsubstituted aromatic magnesium chloride complexes with a phosphorus halide such as an organophosphorus halide, a phosphorus trihalide or a phosphorus pentahalide, as illustrated for trivalent phosphorus in the following equation:

$$mRMgCl \cdot nQ + R'_oR''_pPX_{3-(o+p)} \rightarrow$$
$$R_mR'_oR''_pPX_{3-(m+o+p)} + mMgX_2 + mnQ$$

wherein X is selected from the group consisting of chlorine, bromine, and iodine; $o$ and $p$ equal 0, 1 or 2; $m$ equals 1, 2 or 3; the sum of $(o+p)$ equals 0, 1 or 2; the sum of $(m+o+p)$ equals 1, 2, or 3; R, R' and R'' are as defined above; $n$ is an indeterminate whole number of the order of 1 to 3 and Q is as hereinafter defined. Phosphorus chlorides are the preferred reactants. The following type compounds are the products included within the general type formulas of the phosphorus compounds produced: $RR'R''P$, $RR'PX$, $RPX_2$. When an organophosphine halide is utilized as a reactant, rather than a phosphorus trihalide, said organophosphorus halide may be prepared in accordance with the present process.

An aspect of the present invention is illustrated in the following equation:

$$RMgCl \cdot nQ + PX_3 \rightarrow R_3P + R_2PX + RPX_2 + MgX_2 + nQ$$

wherein $n$, R and X are as defined above and Q is as hereinafter defined. The process may be so controlled that any of the aforementioned products or a mixture of products may be prepared. It is also possible to carry out the reaction stepwise by first reacting an organomagnesium chloride complex with a phosphorus trihalide and then further reacting the product of this reaction with an organomagnesium chloride complex.

Another aspect of the present invention is illustrated by the following equation:

$$3RMgCl \cdot nQ + PCl_5 \rightarrow R_3PCl_2 + 3MgCl_2 + nQ$$

wherein $n$ and R is as defined above and Q as hereinafter defined illustrating the preparation of pentavalent phosphorus compounds.

The phosphonium compounds made in accordance with this invention may be prepared by reacting an excess of the complex $RMgCl \cdot nQ$ with a phosphorus trihalide e.g., $PCl_3$ in the presence of atmospheric oxygen. This reaction produces the phosphonium base which may be converted to a phosphonium salt by a strong acid. The sequence of reaction is illustrated by the following:

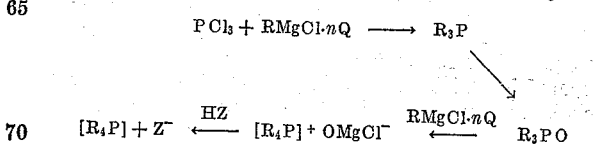

wherein $n$ and R is as defined above and Q is as hereinafter defined.

Compound Q is a substituted or unsubstituted heterocyclic compound (having 5 or 6 atoms in the ring) containing one oxygen atom in the ring structure; the other ring atoms being carbon with the exception that one nitrogen atom may be substituted for any carbon atom other than those carbon atoms adjacent to the oxygen. The heterocyclic compounds may contain a single unsaturated bond, as in dihydropyran. Compounds within this definition include tetrahydrofuran, tetrahydropyran, 2-methyltetrahydrofuran, tetrahydrofurfuryl ethyl ether, dihydropyran, and N-methylmorpholine. Permissible substitutions on Q are groups which are not reactive with organomagnesium chloride complexes, or with any of the other components and products of the reaction mixtures of the present process, and include substituted and unsubstituted alkyl, aryl, alkoxy and aryloxy groups (all allowable substitutes being those unreactive to other components of the reaction mixture as specified hereinbefore). Where nitrogen replaces a carbon atom of compound Q, hydrogen on the nitrogen atom must be substituted with a group unreactive to the reactants or reaction products. A further requirement for Q is that the oxygen must be available for electron donation, i.e., the free p-electrons present on the oxygen should be available for coordination with the organomagnesium chloride. Any blocking groups in the 2 and 5 (6) position may restrict the availability of these electrons. Another way these electrons may be restricted in their availability is by p-pi resonance, as for example in furan, which is not operative. One double bond giving p-pi resonance, as in dihydropyran (which is operative) allows reactivity since the oxygen still has free p-electrons. Expressed in another fashion, the oxygen of the heterocyclic ring structure must be such that electrons of the oxygen atom are available for coordination and complex formation with magnesium. Since Q also apparently functions as a solvent, a Q which has a high melting point may still function in this invention, but if it is used as solvent, obviously the high melting point (e.g., above 90° C.) causes great difficulty in carrying out the reaction. Any liquid Q of any structure whatsoever (with the limitations specified hereinbefore) will work. Preferred Q compounds are: tetrahydrofuran, tetrahydropyran, 2-methyltetrahydrofuran and tetrahydrofurfuryl ethyl ether.

When the aromatic magnesium chloride complex is reacted with the halogen phosphorus compound, the product may be many of the type compounds listed hereinbefore as products, or any mixture of them dependent upon the reactants used, the relative proportions of the products used, and the process conditions. By control of the process variables, it is possible to produce a product containing a preponderance of a desired reaction product. Thus, when an excess of $RMgCl \cdot nQ$ is reacted with $PX_3$, the desired product would be $R_3P$.

If all of the halogen in the phosphorus halide is to be replaced, the phosphorus containing halide is added to the aromatic magnesium chloride-complex, usually dissolved in excess compound Q. If a substituted phosphorus halide is desired, the organomagnesium chloride-complex is preferably added to the phosphorus-containing reactant dissolved in an inert solvent. The reaction is preferably agitated. The reaction temperature will vary with the reactants and solvents utilized and the products desired, and will usually be between room temperature and the reflux temperature of the reaction mixture. The reaction is exothermic. For special conditions, it may be desirable and/or necessary to carry the reaction out, at low temperatures, or under reduced pressures. The reaction is preferably carried out in an inert atmosphere, usually nitrogen. The reactants and solvents are also preferably prepared in an inert atmosphere. The reaction products include one or more phosphine compounds, the magnesium halide salt, compound Q, and solvent if used. These may be separated by conventional means, e.g., hydrolysis, solvent extraction, filtration and distillation. The solvent is easily distilled off. The desired reaction product is usually distilled at reduced pressure.

If a solvent is utilized, it must be inert to the other components of the reaction mixture under the process conditions and is preferably an organic solvent that distills below 150° C. The preferred solvents include substituted and unsubstituted tetrahydrofuran, tetrahydropyran, heptane, hexane, pentane, octane, isooctane, cumene, xylene, etc. A solvent system containing more than one component may also be used.

$RMgCl \cdot nQ$ complexes in which Q is tetrahydrofuran are especially preferred. This compound is commercially available, relatively inexpensive and such complexes, when utilized in this process, provide excellent yields. For similar reasons the organophosphorus chlorides and phosphorus chlorides are preferred reactants.

The following examples are further illustrative of the present invention. It is to be understood, however, that this invention is not restricted thereto.

*Example 1*

Phenylmagnesium chloride-tetrahydrofuran complex was prepared by a reaction, in tetrahydrofuran, of 450 grams (4 moles) of chlorobenzene and 97 grams (4 g. atoms) of magnesium. To this was added slowly (1½ hours) a solution of 137 grams (1 mole) of phosphorus trichloride in 1 liter of tetrahydrofuran, the mass being stirred mechanically. Heat evolved during the addition kept the batch refluxing. Afterward heat was supplied externally to maintain reflux temperature for about 5 hours. The batch was then poured into 4 liters of water with vigorous stirring. A solution of 150 ml. of concentrated HCl in 500 ml. of water was added. The mixture then separated cleanly into two liquid layers. The organic layer was dried over sodium sulfate and then distilled to a pot temperature of 173° C. On cooling the pot bottoms (residues), well formed crystals of triphenyl phosphine were deposited. These crystals, together with others recovered by extraction from the water layer, were recrystallized from ethyl alcohol to yield a product melting at 78.5° C. and containing 12.4% P and 0.13% Cl. (Theory 11.8% P.) The yield of this product was 78%. Analysis indicated that by complete working up of mother liquors, the yield could be brought above 90%.

*Example 2*

Following the procedure of Example 1, m-fluorophenylmagnesium chloride-tetrahydropyran complex is reacted with phosphorus trichloride in hexane, to yield tri(m-fluorophenyl)-phosphorus.

*Example 3*

Following the procedure of Example 1, pentachlorophenyl magnesium chloride - 2 - methyltetrahydrofuran complex is reacted with phosphorus triiodide in cumene, to yield tri(pentachlorophenyl)phosphorus.

*Example 4*

Following the procedure of Example 1 p-dimethylaminophenyl magnesium chloride - 2 - ethoxytetrahydropyran complex is reacted with phosphorus trichloride in tetrahydropyran, to yield tri(p-dimethylaminophenyl)-phosphorus.

*Example 5*

Following the procedure of Example 1 p-octadecylphenyl magnesium chloride-tetrahydrofuran ethyl complex is slowly added to an excess of phosphorus trichloride in xylene, to yield p-octadecylphenylphosphorus dichloride.

*Example 6*

Following the procedure of Example 1, 1-naphthyl magnesium chloride-N-methylmorpholine complex is reacted with p-octadecylphenyl phosphorus dichloride in tetrahydrofuran to yield di(naphthyl-1)-p-octadecylphenylphosphine.

Example 7

Following the procedure of Example 1, 2-chloro-4-tolylmagnesium chloride-dihydropyran complex is reacted with phosphorus trichloride in isooctane, to yield tri(chlorotolyl)phosphorus.

Example 8

Following the procedure of Example 1, nonachlorobiphenylmagnesium chloride-tetrahydrofuran complex is reacted with phosphorus trichloride in tetrahydrofuran, to yield tri(nonachlorobiphenyl)phosphorus.

Example 9

The preparation of a semi-commercial lot of triphenyl phosphorus follows:

1 lb. of ethyl bromide and ½ ounce of iodine were added to 100 lbs. of magnesium, slurried with 5% of a mixture of 426 lbs., 6 ounces of chlorobenzene in 238 lbs., 13 ounces of tetrahydrofuran. When the reaction had initiated, the remainder of the tetrahydrofuran-chlorobenzene mix was added over a one hour period. The reaction mixture was then refluxed for one hour. 178 pounds, 13 ounces of phosphorus trichloride mixed with 580 lbs., 5 ounces of tetrahydrofuran was then added to the reaction mixture over a period of one hour. The mixture was then refluxed over three hours; cooled and then immersed in 100 gallons of water to extract the magnesium chloride. The aqueous and organic phases were separated. Tetrahydrofuran was evaporated from the organic phase, leaving crude triphenyl phosphorus. This was purified by crystallization from alcohol to yield 150 pounds of purified triphenyl phosphorus.

The process of the present invention is an efficient and economical process for producing organic phosphorus compounds. These compounds exhibit great reactivity with such elements as oxygen and fluorine and may be utilized as reducing agents, catalysts, oxygen getters, defluorination reagents, etc. These compounds are also utilized as intermediates in the preparation of various insecticides. In particular, triphenyl phosphorus is a polymerization catalyst in the preparation of silicone resins.

While the invention has been described with particular reference to specific embodiments, it is to be understood that it is not limited thereto but is to be construed broadly and restricted solely by the scope of the appended claims.

What is claimed is:

1. A process for producing a phosphorus compound wherein the phosphorus atom is bonded directly to at least one aryl group which comprises reacting an aryl magnesium chloride with a phosphorus halide in the presence of at least one mole of a cyclic ether for every mole of aryl magnesium chloride wherein said ether contains from 5 to 6 atoms in the ring and wherein (a) there is only one oxygen atom in the ring, (b) the other ring atoms are carbon, (c) one ring carbon separated from the oxygen atom in the ring by two carbon atoms may be replaced by an alkyl substituted nitrogen atom, (d) the ring contains not more than one double bond, (e) at least one carbon atom adjacent the oxygen atom in said ring being free of any substituents other than hydrogen, (f) said ether contains no substituent which reacts with organomagnesium chlorides.

2. A process for producing a phosphorus compound wherein the phosphorus atom is bonded directly to at least one aryl group which comprises reacting an aryl magnesium chloride with a phosphorus halide in the presence of at least one mole of an ether selected from the class consisting of tetrahydrofuran, tetrahydropyran, 2-methyltetrahydrofuran, tetrahydrofurfuryl ethyl ether, 2-ethoxy-tetrahydropyran, dihydropyran and N-methylmorpholine, for every mole of aryl magnesium chloride.

3. A process according to claim 2 wherein the aryl magnesium chloride is phenyl magnesium chloride.

4. A process according to claim 3 in which phosphorus trichloride is used.

5. A process according to claim 4 in which three moles of phenyl magnesium chloride are used to produce triphenylphosphine.

6. A process according to claim 5 in which the reaction is carried out in the presence of an inert organic solvent.

7. A process according to claim 3 in which the ether is tetrahydrofuran.

References Cited in the file of this patent

FOREIGN PATENTS 516,306   Canada _____ Sept. 6, 1955

OTHER REFERENCES

Kosolapoff: "Organophosphorus Compounds," John Wiley & Sons, Inc., New York (1950), pages 16–17.

Wertheim: "Textbook of Organic Chemistry," 3rd ed., McGraw-Hill Book Co., Inc., New York (1951), p. 640.